United States Patent [19]
Christensen

[11] Patent Number: 5,050,716
[45] Date of Patent: Sep. 24, 1991

[54] TORQUE CONVERTER DRIVE UNIT

[76] Inventor: Reed K. Christensen, 4445 Whispering Oaks Cir., Roseville, Calif. 95661

[21] Appl. No.: 602,860

[22] Filed: Oct. 23, 1990

[51] Int. Cl.⁵ ............................................. B60K 17/02
[52] U.S. Cl. .................... 192/3.23; 192/3.34
[58] Field of Search ...................... 192/3.23, 3.34

[56] References Cited

U.S. PATENT DOCUMENTS

| | | | |
|---|---|---|---|
| 2,726,556 | 12/1955 | Greenlee | 192/3.23 |
| 3,473,411 | 10/1921 | Paredes | 74/688 |
| 3,526,304 | 9/1970 | Pearce et al. | 192/3.23 |
| 3,578,120 | 5/1971 | Hilpert | 192/3.33 |
| 3,659,690 | 5/1972 | Kitano et al. | 192/3.33 |
| 4,246,997 | 1/1981 | Tarumizu | 192/3.27 |
| 4,361,217 | 11/1982 | Bieber et al. | 192/1034 A |
| 4,437,550 | 3/1984 | Nozawa | 192/3.23 |
| 4,580,671 | 4/1986 | Matsuoka et al. | 192/0.076 |
| 4,876,922 | 10/1989 | Koshimo | 74/731 |
| 4,966,264 | 10/1990 | Hayakawa et al. | 192/3.34 |

FOREIGN PATENT DOCUMENTS

| | | |
|---|---|---|
| 654123 | 12/1962 | Canada . |
| 4635284 | 1/1967 | Japan . |
| 712290 | 7/1954 | United Kingdom . |
| 885553 | 12/1964 | United Kingdom . |

Primary Examiner—Allan D. Herrmann
Assistant Examiner—Nicholas Whitelaw
Attorney, Agent, or Firm—John P. O'Banion

[57] ABSTRACT

A torque converter drive unit in which an input shaft driven by a mechanically powered torque converter is frictionally coupled with an output shaft such that rotation of the input shaft in one direction only will cause corresponding rotation of the output shaft, rotation of the output shaft being prevented by operation of an electric solenoid controlled braking mechanism on the output shaft, thereby permitting instantaneous coupling of the input shaft and output shaft for operation of a racing vehicle from a starting line.

13 Claims, 6 Drawing Sheets

TORQUE CONVERTER DRIVE UNIT

BACKGROUND OF THE INVENTION

1. Field of the Invention

This invention pertains to a torque converter drive unit which couples power from an engine-driven torque converter in a racing vehicle to an output shaft which, when attached to a transmission to allow gear ratio changes and provide a neutral and reverse gear, drives the wheels of the vehicle.

2. Description of the Background Art

In the area of automobile drag racing, it is important to achieve a quick start off the line. One method of achieving a quick start is to hold the vehicle in place with the wheel brakes, operate the vehicle engine at high speed, stall the torque-converter equipped automotive transmission which is coupled to the drive shaft, and then release the wheel brakes. Another method is to adapt a torque converter-equipped automotive transmission to operate in both forward gear and reverse gear at the same time, and to quickly release the reverse gear thus propelling the vehicle forward. Because of the high torque developed by drag racing engines, however, wheel brakes are generally inadequate, and adapted transmissions fatigue quickly or are destroyed after a few uses.

At present, the most widely used device is a passenger-car planetary transmission modified so that both the forward gear and reverse gear can be engaged at the same time for a braking effect. These devices are simply not capable of surviving the stress developed by high torque engines in this application.

Various automotive transmission apparatus are known in the art. For example, Japanese Patent No. 46-35284 issued to Honda Giken KK on Jan. 23, 1967, discloses an apparatus in which a control valve which is opened by the ratio of 1:1 in response to a torque ratio is disposed on the torque converter and the valve is interposed in a pressure oil supply circuit of a hydraulic clutch which is in parallel with the converter characterized in that a second control valve is provided which is opened at a high speed in response to the speed of a transmitting shaft; and the second valve is interposed in said pressure oil supply circuit in series with said control valve so that an oil supply to the clutch is interrupted automatically at the low speed of the transmitting shaft.

British Patent No. 712,290 issued to Svenska Rotor Maskiner Aktiebolag on July 21, 1954, discloses a power transmission comprising a hydraulic torque converter constructed for alternative operation as a single rotation or double rotation converter for transmitting power from a driving member to a driven member, a rotatably mounted reaction member, releasable braking means for holding said reaction member rotationally stationary and to release the same for rotation in either direction, fluid pressure actuated means for engaging said braking means including a control valve and means responsive to predetermined variations in the speed ratio between said driving and driven members for moving said valve to effect engagement or release of said braking means.

British Patent No. 885,553 issued to Clark Equipment Company on Dec. 28, 1964, discloses a power transmission mechanism comprising a hydrodynamic torque converter, a selectively engagable fluid pressure actuated clutch for connecting the torque converter to a load, a fluid distributor, a high pressure passage communicating with an inlet passage in the distributor and with the fluid activated clutch, two low pressure passages, and low and high pressure valves. The apparatus provides a unitary substructure to avoid the complexity of fluid circulation passages in conventional transmissions.

Canadian Patent No. 654,123 issued to Ahlen on Dec. 18, 1962, discloses a power transmission and braking device comprising a hydraulic torque converter having a primary or pump member connected to the driving shaft, a secondary member connected to the driven shaft, a rotatably mounted reaction member, a reversing mechanism connecting said reaction member and said turbine member, means for selectively connecting said pump member and said turbine member for simultaneous rotation at a speed ratio of unity, and control means for selectively engaging said reversing mechanism to drive said reaction member in a direction opposite to that of said turbine and pump members when said turbine and pump members are driven as a unit on one and the same direction to provide a hydraulic braking effect.

U.S. Pat. No. 3,578,120 issued to Hilpert on May 11, 1971, discloses a hydraulically operated friction device, such as a clutch or a brake, which have hydraulic means for varying the amount of clamp up between the interleaved clutch plates, thereby providing a controllable amount of slip between the drive and driven members of the clutch.

U.S. Pat. No. 4,876,922 issued to Koshimo on Oct. 31, 1989, discloses a stepless speed-change transmission for a vehicle. The apparatus prevents power from being transmitted to the driven shaft when the vehicle is at rest, thus eliminating creep and providing smooth power transition when desired.

Various other transmission related apparatus are also shown. For example, U.S. Pat. No. 3,659,690 issued to Kitano et al. on May 2, 1972, discloses a hydraulic control system for a vehicle having a transmission provided with fluid activated clutch means connected to a torque converter and hydraulic brake means for arresting movement of the vehicle. U.S. Pat. No. 3,473,411 issued to Paredes on Oct. 21, 1969, discloses a hydrokinetic torque converter for use in an automotive vehicle drive line. U.S. Pat. No. 4,246,997 issued to Tarumizu on Jan. 27, 1981, discloses an apparatus for allowing a clutch equipped torque converter to slip when an engine is at high idle but keep engaged without slip at low idle. U.S. Pat. No. 4,361,217 issued to Bieber et al. on Nov. 30, 1982, discloses a clutch assembly for a semiautomatic gear transmission. U.S. Pat. No. 4,580,671 issued to Matsuoka et al. on Apr. 8, 1986, discloses a control system for a lock-up torque converter attached to an automobile automatic power transmission.

Although the foregoing patents address some of the various needs of the industry, the devices disclosed in those patents are not capable, even with modification, of instantaneously transferring high levels of mechanical power to driven wheels without risk of failure, a deficiency which the subject invention overcomes. The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

This invention pertains to a torque converter drive unit which couples power from an engine-driven torque converter in a racing vehicle to an output shaft which, when attached to a transmission to allow gear ratio changes and provide a neutral and reverse gear, drives the wheels of the vehicle. By way of example and not of limitation, the invention generally comprises an apparatus which is coupled between an engine-driven torque converter and the drive train of a drag racing vehicle. The input shaft of the apparatus is driven by the engine-driven torque convertor and coupled to the output shaft of the apparatus by means of a sprag clutch. In normal operation, the sprag clutch permits power to be transferred from the input shaft to the output shaft to drive the vehicle. Note that the sprag clutch is for safety purposes and that the apparatus could be built with direct coupling between the input shaft and the output shaft. In standby or starting line operation, an internal braking mechanism prevents the output shaft from rotating, thereby allowing high speed engine operation to cause the torque converter to slip (or stall), while maintaining the ability to hold the vehicle at the starting line with maximum torque available upon release of the internal braking mechanism.

The internal braking mechanism comprises a brake pack containing a brake hub which is rigidly attached to the output shaft, steel plates that are rigidly attached to the housing of the apparatus but not to the clutch hub, and friction plates which are sandwiched between the steel plates and connected to the clutch hub. A pressure plate is also rigidly attached to the housing as is a hydraulic piston assembly. When the piston is operated, it compresses the interspaced friction and steel plates against the pressure plate, thus locking the output shaft in place and preventing rotation.

The piston assembly is operated by means of an electrically operated solenoid which controls a valve on a pressurized oil supply. When the solenoid is operated, the valve opens and pressurized oil is routed behind the piston assembly causing the piston to operate. When the solenoid is de-energized and the valve closes, the pressure is released and springs return the piston to its resting position which, in turn, releases the compression of the friction plates and steel plates to permit the output shaft to rotate.

It should be noted that the apparatus disclosed herein can be used for other applications, such as coupling motors to the drive train of industrial conveyor systems, or any other application where a high speed start is required, where variable power transmission is required, or where a braking mechanism is required.

An object of the invention is to couple high torque engines to a vehicle drive train and, when operating at high engine speeds, instantaneously transmit that torque to the drive train.

Another object of the invention is to improve the speed with which a drag racing vehicle can be ejected from a starting line position.

Still another object of the invention is to transfer energy from a rotating input shaft to an output shaft at high speeds without risk of mechanical failure.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Referring more specifically to the drawings, for illustrative purposes the present invention is embodied in the apparatus generally shown in FIG. 1 and FIGS. 2A through 2H. It will be appreciated that the apparatus may vary as to configuration and as to details of the parts without departing from the basic concepts as disclosed herein.

Figure 1:
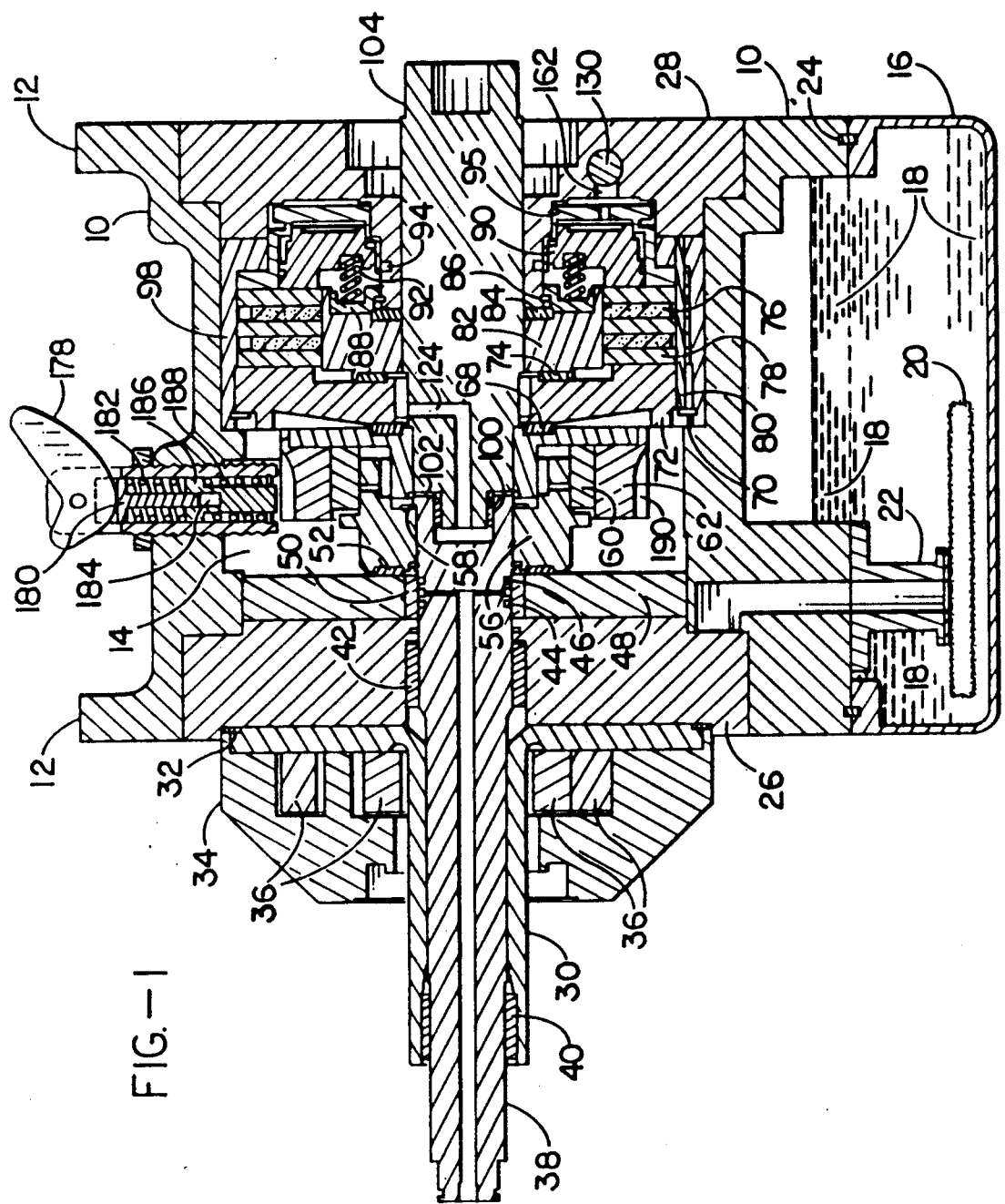
FIG. 1 is a longitudinal cross-section view of one embodiment of the apparatus.
Figure 2A:
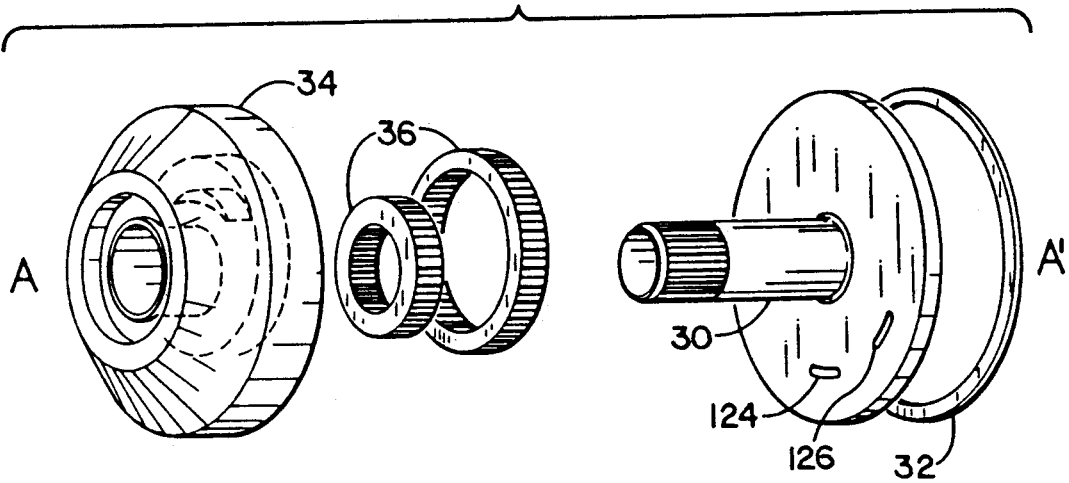
FIGS. 2A through 2H are exploded views.
Figure 2B:
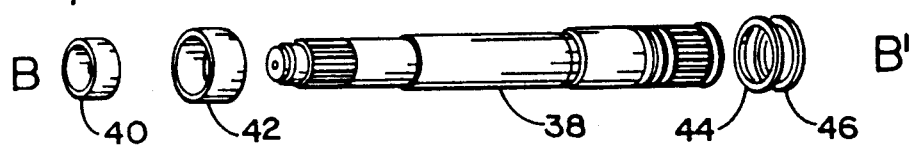
Figure 2C:
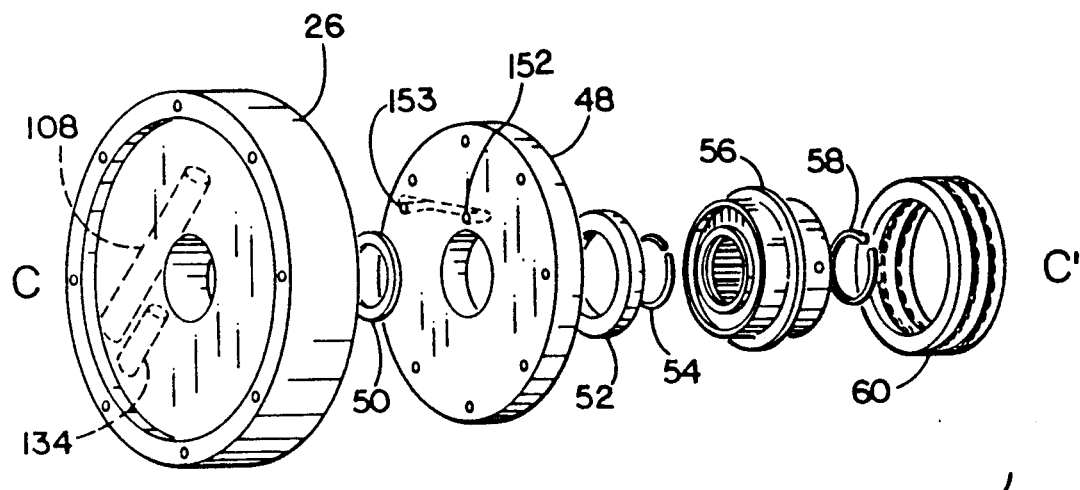
Figure 2D:
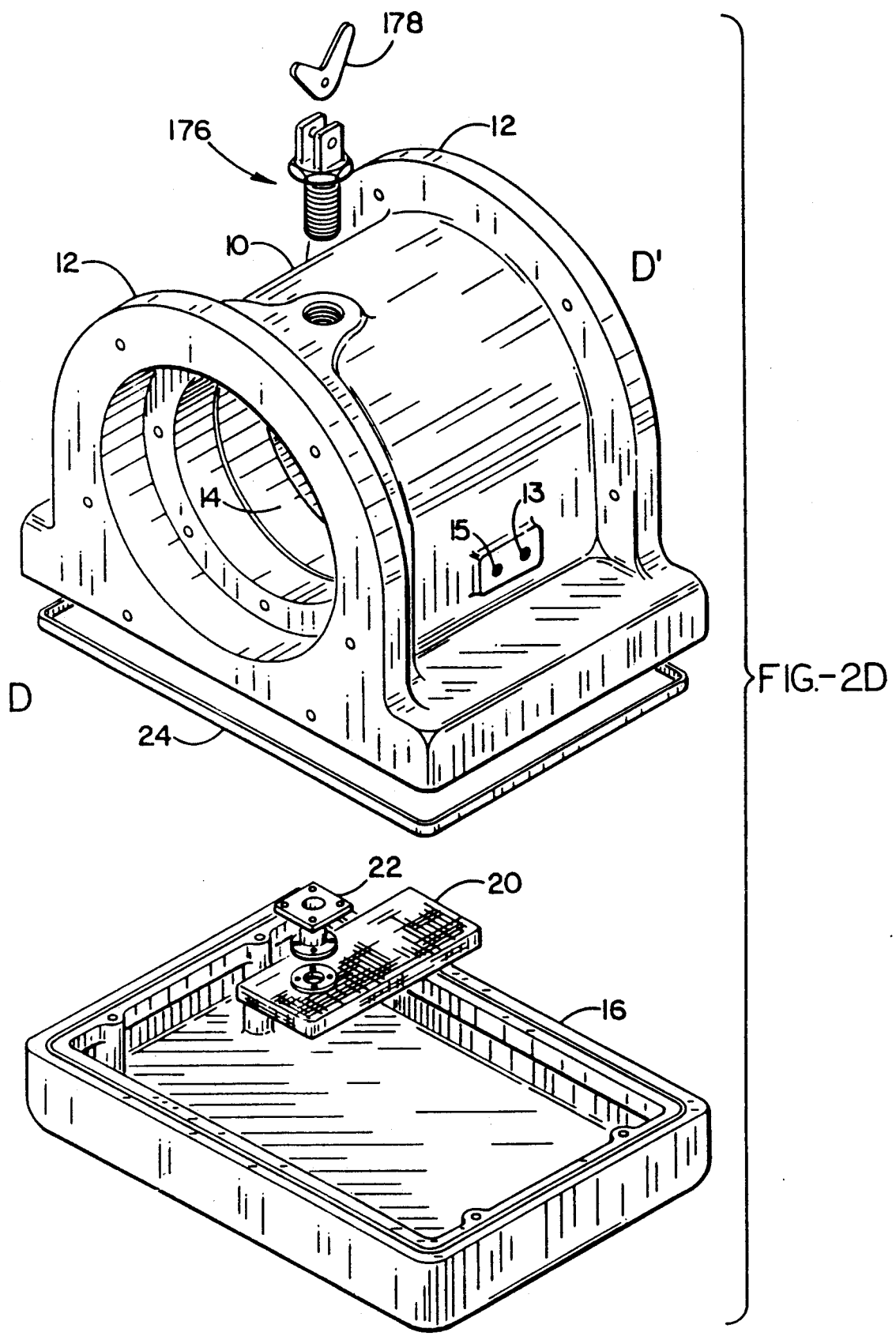

Referring to FIG. 1, and FIG. 2D, housing 10 has flanges 12 at each end adapted to be bolted or otherwise coupled between an engine-driven torque converter and a device to be powered, such as a vehicle drive train (e.g., transmission). Housing 10 contains a cavity 14 which encloses the bulk of the components of the invention. Preferably located at the bottom portion of housing 10, is attached oil pan 16 which contains lubricating oil 18 for the apparatus. Oil pan 16 could be positioned elsewhere, but the preferred location is at the bottom of housing 10 so that lubricating oil 18 will gravity feed into oil pan 16. Located within the enclosure defined by oil pan 16 is located oil filter 20 which is held in place by filter support 22. Filter support 22 is a stand off bushing or other device attached to both housing 10 and oil filter 20 as shown. Disposed between housing 10 and oil pan 16 is a rubber seal 24 to prevent oil leakage.

Figure 2E:
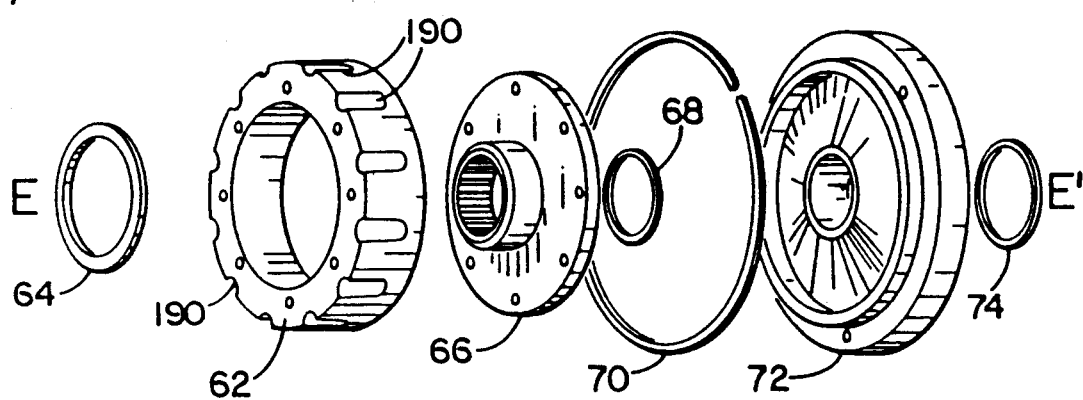
Figure 2F:
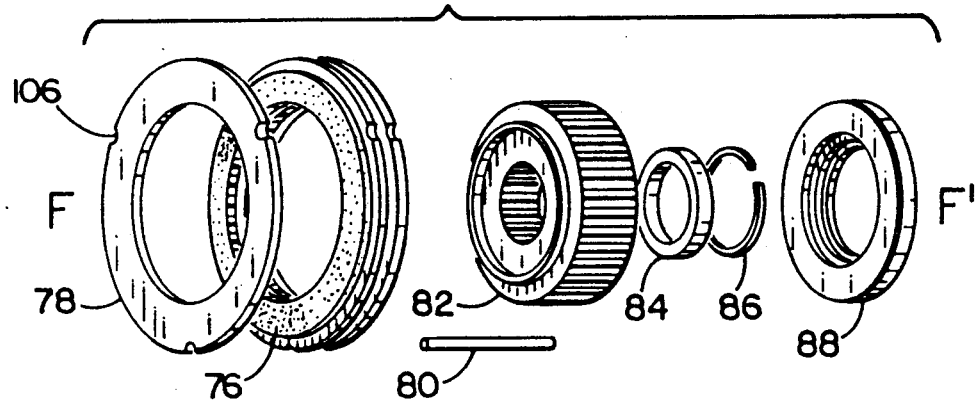
Figure 2G:
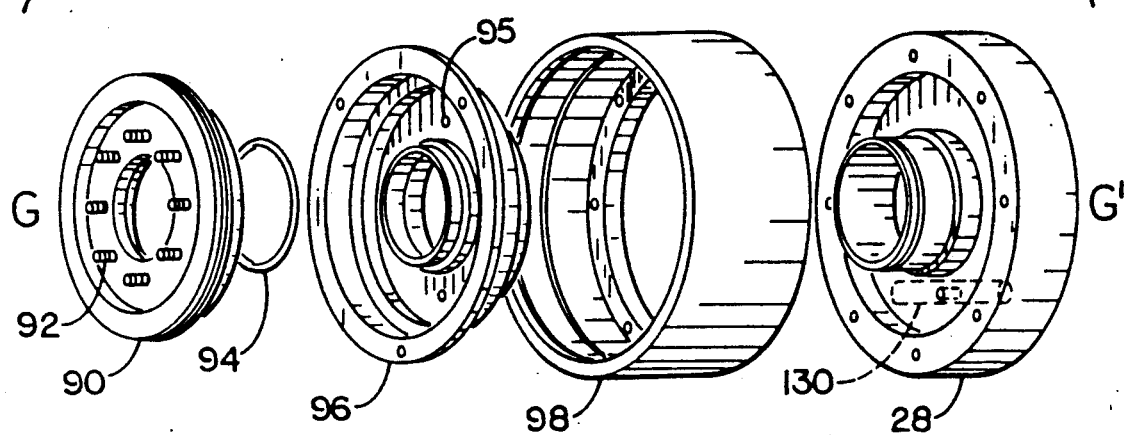
Figure 2H:
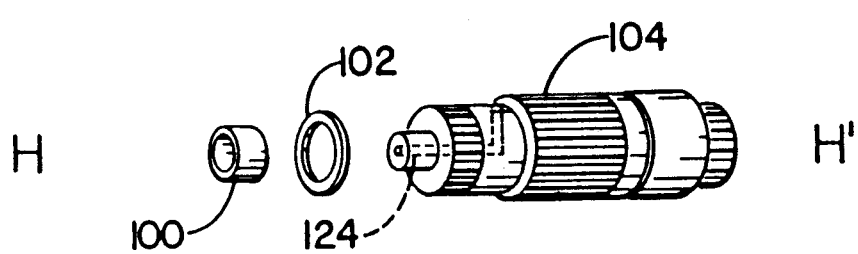

Referring to FIG. 1, FIG. 2C and FIG. 2G, front main body 26 is attached at the end of housing 10 which will be in closest proximity to the engine or torque converter driving the apparatus. Rear main body 28 is attached at the end of housing 10 which will be in closest proximity to the vehicle's drive train. Front main body 26 and rear main body 28 bolt to housing 10 and fit within cavity 14.

Referring now to FIG. 1 and FIG. 2A, stator support shaft 30 is essentially a hollow shaft and flange which is bolted o otherwise attached to the face of front main body 26 and is sealed with sealing ring 32. Splines on the opposite end of stator support shaft 30 engage matching splines in the stator in the torque converter driving the apparatus. The hole in the center of stator support shaft 20 is thereby aligned with a hole in the center of front main body 26. Oil pump housing 34 with pump gears 36 installed slides over stator support shaft 24 and is bolted or otherwise attached to front main body 26. The neck of the torque converter driving the apparatus slides over stator support shaft 30 and engages pump gears 36 inside oil pump housing 34. In this way, oil pump gears 36 are driven directly from the torque converter. Note that this is one of two linkages between the torque converter and the apparatus described herein. The other linkage is a fluid coupling between the torque converter and this apparatus. Oil injected into the torque converter turns a turbine which drives input shaft 38. Input shaft 38 is splined on one end to mate with broaches on the turbine hub of the torque converter.

It should be noted that oil pan 16, oil pump housing 34, and oil pump gears 36 could be eliminated and replaced with a "dry sump-type" remotely mounted pump which is belt driven from the engine of the vehicle or another power source. The pump would have separate scavenge and pressure stages, and lubricating oil 18 would be contained in a reservoir tank located elsewhere in the vehicle. The advantage of this configuration is that oil pan 16 could be eliminated to permit the apparatus to be used on vehicles where ground clearance is restricted or where vehicle frame designs do not provide room or clearance for the oil pan.

Referring to FIG. 1 and FIG. 2B, input shaft 38 extends through stator support shaft 30 and front main body 26. Input shaft 38 rotates in stator support shaft 30 on front bearing 40 located inside the end of stator support shaft 30 opposite front main body 26 and on center bearing 42 which is located in the center of front main body 26. One end of input shaft 38 is splined to mate with the turbine hub in the torque converter driving the apparatus and the other end is splined to mate with inner sprag clutch race 56 (See FIG. 2C). Seals 44 and 46, which are teflon rings, are located in groves on input shaft 38 between center bearing 42 and inner sprag clutch race 56.

In FIG. 1 and FIG. 2C it can be seen that transfer body 48 is attached to the side of front main body 26 facing toward the inside of housing 10. Transfer body 48 serves to transfer oil between portions of front main body 26. Located inside a hole in the center of transfer body 48 is bushing 50 which serves as a wear surface for seals 44 and 46. Thrust bearing 52 is located between transfer body 48 and inner sprag clutch race 56. Inner sprag clutch race 56 is splined or otherwise attached to input shaft 38 at the end of input shaft 38 which protrudes through transfer body 48 toward the center of housing 10. Inner sprag clutch race 56 is held in place on input shaft 38 by spiral snap rings 54 and 58, each located in a groove on input shaft 38 on each side of the splines to which inner sprag clutch race 56 attaches to input shaft 38. Sprag clutch 60 rides on the outer surface of inner sprag clutch race 56.

Referring also to FIG. 2E, outer sprag clutch race 62 fits over sprag clutch 60. Sprag clutch 60 rotates between inner sprag clutch race 56 and outer sprag clutch race 62. Thrust bearing 64 is situated between the hub on backing plate 66 and inner sprag clutch race 56 as shown. Backing plate 66 has a center hub which is smooth on the outside and splined on the inside. Backing plate 66 is bolted o otherwise attached to outer sprag clutch race 62. Output shaft 104 (See FIG. 2H) is splined to backing plate 66.

Sprag clutch 60 permits input shaft 38 to rotate freely in one direction of rotation, which is usually the opposite direction of engine rotation. When input shaft 38 rotates in the direction of engine rotation, sprag clutch 60 frictionally engages inner sprag clutch race 56 and outer sprag clutch race 62, thereby coupling input shaft 38 to output shaft 104. Sprag clutch 60 is of the conventional type which contains "fingers" or elements floating in a carrier and pivoting about their centers. These "fingers" essentially lay flat when sprag clutch 60 is rotated in one direction but stand up when it is rotated in the opposite direction.

Referring to FIG. 1, FIG. 2E, FIG. 2F, FIG. 2G and FIG. 2H, brake drum 98 is attached to the side of rear main body 28 facing toward the inside of housing 10. Outer piston 96 is positioned over output shaft 104 and registers inside clutch drum 98 and rear main body 28. Inner piston 90 registers inside outer piston 96, is aligned over a hub in outer piston 90, and is sealed with o-ring 94. An o-ring is also placed around the outer circumference of inner piston 90, thus sealing the space between inner piston 90 and outer piston 96.

Blocking pins 80 extend through holes at the outer circumference of outer piston 96 and into threaded holes in brake drum 98. Blocking pins 80 have smooth surfaces such that outer piston 96 can freely slide over them. In the embodiment shown, three such pins are installed. Blocking pins 80 also extend through pressure plate 72. Pressure plate 72 registers inside brake drum 98 and is held in place by snap ring 70, with thrust bearing 68 installed between backing plate 66 and pressure plate 72. Thrust bearing 74 is installed between pressure plate 72 and a recess in the face of brake hub 82.

The foregoing assembly essentially establishes a brake pack housing without the internal components installed. It can be seen at this point then, that outer piston 96 and inner piston 90 can move freely inside clutch drum 98 on blocking pins 80, between rear main body 28 and pressure plate 72.

Inside the brake pack housing resides a braking assembly for output shaft 104. Return springs 92 register between one side of inner piston 90 and spring cup retainer 88. Spring cup retainer 88 is held in place on the hub of rear main body 28 by snap ring 86. Bearing 84 is located between brake hub 82 and the end of the hub on rear main body 28. Brake hub 82 is positioned around output shaft 104 and is broached on the inside to match the splines near the center of output shaft 104. Brake hub 82 is splined on its outer surface to accept friction plates 76. Interspaced with friction plates 76 are steel plates 78 which are stamped with cutouts 106 which hold at their inner circumference against blocking pins 80. Friction plates 76 are typically made of metal coated with a clutch-type friction coating or an equivalent material.

Needle bearing 100 is inserted over the end of output shaft 104 which engages outer sprag clutch race 60 and registers inside the end of input shaft 38 which engages inner sprag clutch race 56, separated only by busing 102.

Figure 3:
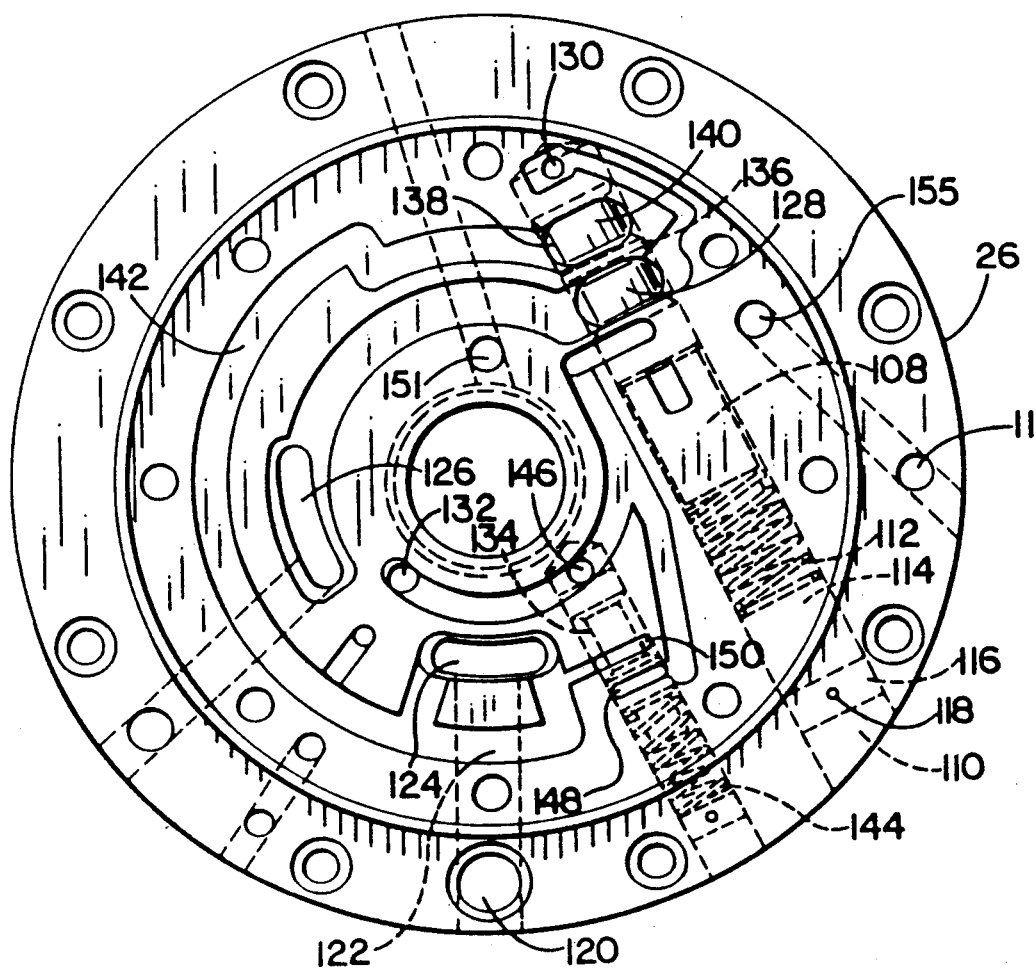
FIG. 3 is a cross-sectional view of the front main body portion of the apparatus depicted in FIG. 1.

Referring now to FIG. 3, front main body 26 controls the pressure of lubricating oil 18 in the apparatus by means of control valve 108, which is a spool valve. Control valve 108 is positioned and travels in bore 110 in front main body 26. Control valve 108 is held in place by means of spring 112 that is loaded by spacer 114 held in place by plug 116 and roll pin 118. Lubricating oil 18 is introduced into front main body 26 when suction is created by oil pump gears 36 being turned by the torque converter to which the apparatus is coupled. This suction draws lubricating oil 18 from oil pan 16 into front main body 26 through inlet 120, through channel 122, through outlet hole 124 on the forward side of front main body 26, and through stator support shaft 30 where it is drawn through oil pump gears 36. From there, lubricating oil 18 is pushed back through the flange on stator support shaft 30 and back through front main body 26 at outlet hole 126.

Lubricating oil 18 then flows toward four destinations. First through window 128 and into bore 110. Second, over control valve 108 and on to line pressure control feed hole 130. Third, toward converter feed hole 132. Fourth, to converter pressure control check valve 134.

Initially, pressurized lubricating oil 18 encounters control valve 108 in its fully closed position and blocks passage through window 128. The size, shape, and placement of control valve 108 in this position prevents oil from flowing between control valve 108 and bore 110. In this manner, pressure rapidly builds in the system. The pressurized oil flows through line pressure control feed hole 130 and presses against the end of control valve 108. Here, the oil performs a "tug of war" with spring 112 holding control valve 108. There is a balance of pre-load spring pressure such that, as the pressure builds to the desired operating level, line pressure control feed hole 130 allows sufficient oil pressure to press against the end of control valve 108 and push it back sufficiently so that land 136 on control valve 108 no longer covers window 128. This allows lubricating oil 18 to exhaust into bore 110 and make its way under and around the smaller diameter end 138 of control valve 108 to the opened exhaust window 140. From exhaust window 140, the exhausted lubricating oil 18 moves back around through exhaust channel 142, to window 124 which is where the oil circulation started. This is the mechanism which controls the pressure in the system.

Converter pressure control valve 134 serves the purpose of controlling or limiting the pressure of the oil delivered to the torque converter by way of converter feed hole 132. Initially, the oil encounters pressure control valve 134 in its closed position. The pressurized oil flows through feed hole 146 and presses against the end of pressure control valve 134. Oil pressure continues to build until it reaches a point at which the resistance of pressure control valve spring 144 is overcome. At this point, pressure control valve 134 is pushed back sufficiently to permit the oil to flow or vent under window 148 and on to window 150 where oil is recycled to the inlet side of the oil pump through channel 142.

Converter feed hole 132 is the source for oil that services the torque converter driving the apparatus. The path that the pressurized oil follows is forward from converter feed hole 132, through front main body 26, then between stator support shaft 30 and the neck of the torque converter. After being used in the torque converter, the oil returns by passing between input shaft 38 and the inside wall of stator support shaft 30. Just inside front main body 26, the oil is stopped from going past front main body 26 by a seal inside front main body 26 behind center bearing 42. This forces the oil through front main body 26 to hole 151 where it flows into transfer body 48 at hole 152, traverses transfer body 48 to hole 153 where it re-enters front main body 26 at hole 155. From hole 155 the oil traverses to hole 11 where it is routed out of housing 10 and on to a remote oil filter and cooler through outlet 15.

After returning from the remote oil filter and cooler, the oil re-enters housing 10 at inlet 13 where it is routed through pressure plate 72, around output shaft 104, through hole 124 in output shaft 104, forward to lubricate sprag clutch 60 and needle bearing 100. After lubricating these parts, gravity returns the oil to oil pan 16 where it starts the circulation process again.

Figure 4:
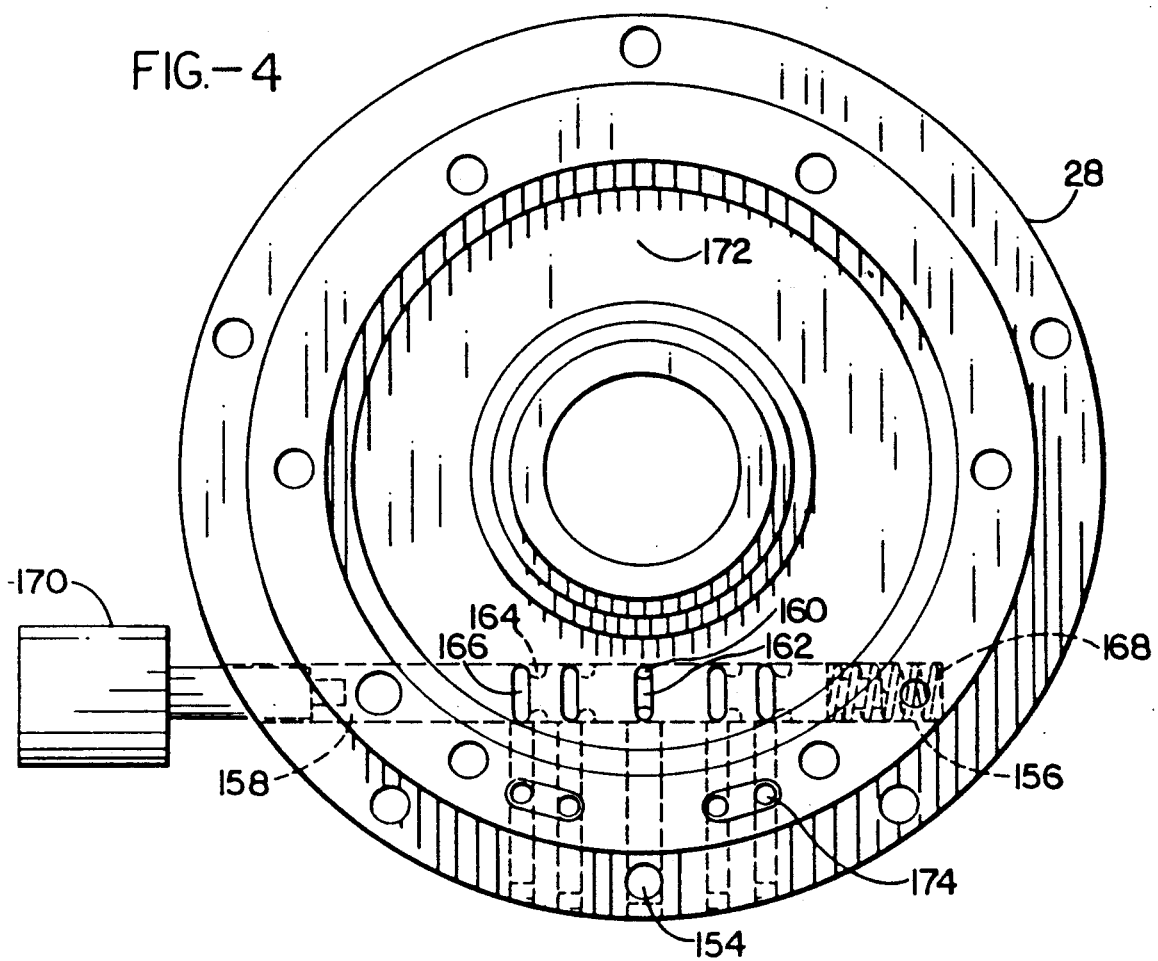
FIG. 4 is a cross-sectional view of the rear main body portion of the apparatus depicted in FIG. 1.

Referring now to FIG. 4, pressurized oil is also supplied to rear main body 28. The pressurized oil enters rear main body 28 at hole 154 and flows upward toward bore 156 and brake valve 158. Here the oil encounters brake valve 158 in its normally closed position such that land 160 on brake valve 158 covers fluid delivery window 162 and the other lands 164 adjacent to the four exhaust windows 166 are open in the vent position. Brake valve 158 is held in place between spring 168 and electric solenoid 170. Here the pressurized fluid is held at closed fluid delivery window 162, waiting for movement of brake valve 158. When solenoid 170 is energized, it compresses spring 168 as it pushes brake valve 158 forward. In its fully extended position, exhaust windows 166 are closed by their respective lands on brake valve 158 as simultaneously fluid delivery window 162 is uncovered by land 160 on brake valve 158, allowing pressurized oil to enter bore 156 of brake valve 158 and flow into cavity 172 behind outer piston 96.

Referring again to FIG. 2G, when oil flows into cavity 172, it pushes outer piston 96 forward, holding friction plates 76 and steel plates 78 firmly together against pressure plate 72, effectively preventing output shaft 104 from rotating. When outer piston 96 is fully extended, oil passing through holes 95 in outer piston 96 cause inner piston 90 to continue to travel, as inner piston 90 is shorter in length than outer piston 96. Inner piston 90 assists outer piston 96 in compression of friction plates 76 and steel plates 78. When solenoid 170 is deenergized, spring 168 forces brake valve 158 to retract to its normally closed position, and land 160 for fluid delivery window 162 closes simultaneously with the opening of lands 164 that had covered exhaust windows 166. Without oil pressure in cavity 172 behind outer piston 96 and inner piston 90, springs 92 that had been compressed by inner piston 90 and outer piston 96 push the pistons back to their at-rest positions, thereby releasing friction plates 76 and steel plates 78 and permitting output shaft 104 to rotate. Oil filled cavity 172 exhausts lubricating oil 18 through exhaust windows 166, down to holes 174, and exits through brake drum 98 where it returns to oil pan 16.

Referring to FIG. 1 and FIG. 2D, as a manual locking device manual lock assembly 176 is installed in housing 10 and is used to prevent output shaft 104 from rotating when the vehicle is at rest. Manual lock assembly 176 has a control lever 178 which, when activated forces primary plunger 180 into slot 184 in secondary plunger 186. Primary plunger 180 is normally restrained by spring 182 and secondary plunger 186 is normally restrained by spring 188. When activated, the spring tension between both plungers is such that the end of secondary plunger 186 near outer sprag clutch race 62, rides on the outer surface of outer sprag clutch race 62 until it engages slot 190 in outer sprag clutch race 62 and prevents rotation thereof. Use of two plungers in this manner permits the manual locking device to be activated, but engagement with outer sprag clutch race does not occur until rotational alignment of secondary plunger 186 and slot 190 is achieved.

Figure 5:
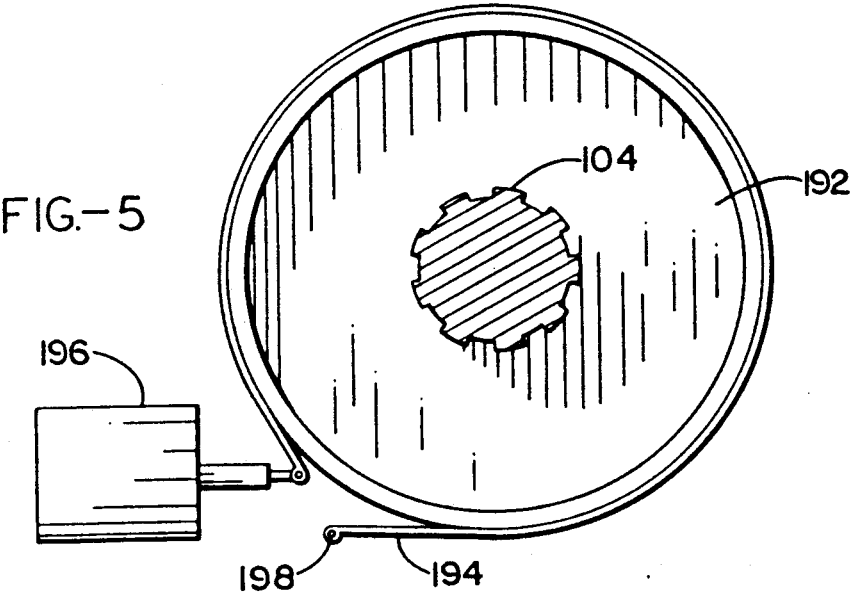
FIG. 5 shows an alternative embodiment of the output shaft braking means portion of the apparatus depicted in FIG. 1.

Referring to FIG. 5, an alternate means for preventing rotation of output shaft 104 would be to replace friction plates 76, steel plates 78, and pressure plate 72, outer piston 96 and inner piston 90 with drum 192, band 194, and piston 196. Drum 192 would be a smooth cylindrical drum which is splined to output shaft 104. Band 194, a flexible metal band, would be placed around drum 192 as shown. One end of band 194 would be rigidly attached to housing 10 at attachment point 198. The other end of band 194 would be attached to piston 196, such that when piston 196 is activated it would force band 194 to tighten around drum 192, thereby preventing rotation of output shaft 104.

Another alternative for assembling the apparatus would be to reposition inner sprag clutch race 56, sprag clutch 60, and outer sprag clutch race 62 such that they are combined with brake hub 82, friction plates 76 and steel plates 78. Outer sprag clutch race 62 would be coupled to friction plates 76, and brake drum 98 would still surround the assembly and be attached to steel plates 78. The apparatus would operate as before, but be shorter in length and lighter in weight.

As an additional feature of the apparatus, a control valve could be placed in the oil return circuit between the apparatus and the engine-driven torque converter. As discussed earlier, this apparatus provides the oil supply for the torque converter. Torque converter efficiency is a function of the pressure differential between the oil injected into the torque converter and the oil exhausted from the torque converter. By adding a solenoid actuated control valve to the circuit which returns oil from the torque converter to this apparatus, back pressure and, therefore, efficiency of the torque converter can be controlled.

Additionally, a lock-up torque converter could be developed which combines the features of a standard torque converter and the brake pack assembly of this apparatus. By installing a brake drum containing alternating steel plates and friction plates in the torque converter such that the steel plates are rigidly attached to the body of the torque converter and the friction plates are connected to the turbine of the torque converter, the torque converter can be "locked" by operation of a solenoid controlled piston. Alternatively, the apparatus disclosed herein could be used to inject oil into the torque converter to operate a piston which would compress the alternating steel plates and friction plates. This would prevent slippage and increase the efficiency of the torque converter.

Accordingly, it will be seen that this apparatus can be used to instantaneously couple high power, high torque engines to a drive shaft for high speed starts from a resting position. This apparatus can also be used to control the efficiency of an engine-driven torque converter driving the apparatus, and by incorporating features of this apparatus into a torque-converter, operate a torque converter in a lock-up mode. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A torque converter drive apparatus, comprising:
   (a) a rotatable driving element, said driving element including means for receiving rotational energy from a torque converter;
   (b) a rotatable driven element, said driven element including means for transferring rotational energy to a vehicle transmission;
   (c) friction coupling means for coupling said driving element to said driven element whereby rotational energy applied to said driving element is transferred to said driven element;
   (d) braking means for preventing said driven element from rotating, said braking means being coupled to said driven element; and
   (e) braking control means for selectively engaging and disengaging said braking means, rotational energy applied to said driving element being transferred to said vehicle transmission upon disengagement of said braking means.

2. The apparatus as recited in claim 1, wherein said friction coupling means comprises:
   (a) an inner bearing race surrounding said driving element, said inner bearing race being coupled with said driving element;
   (b) an outer bearing race surrounding said driven element, said outer bearing race being coupled with said driven element; and
   (c) a sprag clutch disposed between said inner bearing race and said outer bearing race, said sprag clutch frictionally coupling said inner bearing race with said outer bearing race when said driving element is rotated in one direction.

3. The apparatus as recited in claim 1, further comprising:
   (a) a housing, said housing enclosing said driving element, said driven element, said friction coupling means and said braking means; and
   (b) means for coupling said housing to said torque convertor and said vehicle transmission.

4. The apparatus as recited in claim 3, wherein said braking means comprises:
   (a) a stationary brake drum, said brake drum being mounted to the interior of said housing;
   (b) a plurality of friction plates, said friction plates being coupled to said driven element;
   (c) a plurality of steel plates, said steel plates interspaced with said friction plates, said steel plates being coupled to said brake drum, said brake drum preventing rotation of said steel plates;
   (d) a pressure plate, said pressure plate being coupled to said brake drum; and
   (e) a piston, said piston being coupled to said housing, said piston being positioned adjacent to said plurality of friction plates and steel plates, said piston being operable to compress said plurality of friction plates and steel plates against said pressure plate when activated by said braking control means thereby preventing rotation of said driven element.

5. The apparatus as recited in claim 4, wherein said braking control means comprises:
   (a) an electric solenoid;
   (b) a spool valve; and
   (c) a pressurized oil supply, said electric solenoid being coupled to said spool valve, said spool valve being operable to direct said pressurized oil supply toward said piston, said piston being operable by said pressurized oil supply, whereby the user can activate said electric solenoid to rapidly engage or disengage said braking means.

6. An apparatus for transferring power from a torque convertor to a vehicle transmission, comprising:
   (a) a housing, said housing being adapted for coupling to a torque convertor and a vehicle transmission;
   (b) a rotatable input shaft, said rotatable input shaft including means for receiving rotational energy from a torque convertor;

(c) a rotatable output shaft, said rotatable output shaft including means for transferring rotational energy to a vehicle transmission;

(d) an inner bearing race, said inner bearing race surrounding said input shaft, said inner bearing race being coupled to said input shaft;

(e) an outer bearing race, said outer bearing race surrounding said output shaft, said outer bearing race being coupled to said output shaft;

(f) a sprag clutch, said sprag clutch being disposed between said inner bearing race and said outer bearing race, said sprag clutch frictionally coupling said inner bearing race to said outer bearing race when said input shaft is rotated in one direction; and (g) braking means for preventing said output shaft from rotating, whereby rotational energy applied to said input shaft is prevented from being transferred to said vehicle transmission upon engagement of said braking means thereby causing said torque convertor to slip until said braking means is disengaged.

7. The apparatus as recited in claim 6, wherein said braking means comprises:

(a) a stationary brake drum, said brake drum being mounted to the interior of said housing;

(b) a plurality of friction plates, said friction plates being coupled to said output shaft;

(c) a plurality of steel plates, said steel plates being interspaced with said friction plates, said steel plates being coupled to said brake drum, said brake drum preventing rotation of said steel plates;

(d) a pressure plate, said pressure plate being coupled to said brake drum; and (e) a piston, said piston being coupled to said housing, said piston being positioned adjacent to said plurality of friction plates and steel plates, said piston being operable to compress said plurality of friction plates and steel plates against said pressure plate when activated by said braking control means thereby preventing rotation of said driven element.

8. The apparatus as recited in claim 7, further comprising:

(a) an electric solenoid;

(b) a spool valve; and (c) a pressurized oil supply, said electric solenoid being coupled to said spool valve, said spool valve being operable to direction said oil supply toward said piston, said piston being operable by said pressurized oil supply, whereby the user can activate said electric solenoid to rapidly engage or disengage said braking means.

9. A mechanical power transmission apparatus, comprising:

(a) a housing, said housing having a first end and a second end, said first end being adapted for coupling to a torque convertor, said second end being adapted for coupling to a vehicle transmission;

(b) a front main body, said front main body being positioned over said first end of said housing, said front main body being coupled to said housing;

(c) a rear main body, said rear main body being positioned over said second end of said housing, said rear main body being coupled to said housing;

(d) a rotatable input shaft, said input shaft including means for coupling to said torque convertor, said rotatable input shaft extending through said front main body;

(e) a rotatable output shaft, said output shaft including means for coupling to said vehicle transmission, said output shaft extending through said rear main body;

(f) power transfer means to transfer power from said input shaft to said output shaft, said power transfer means being positioned within said housing, whereby rotational energy applied to said input shaft is transferred to said output shaft;

(g) braking means to prevent said output shaft from rotating; and (h) control means to activate said braking means.

10. The apparatus as recited in claim 9, further comprising:

(a) a hollow stator support shaft, said stator support shaft extending through said front main body, said stator support shaft containing bearings through which said input shaft extends; and (b) an oil pump, said oil pump being positioned over said stator support shaft, said oil pump being coupled with said front main body, said oil pump being adapted for coupling with a mechanical power source.

11. The apparatus as recited in claim 9, wherein said power transfer means comprises:

(a) an inner bearing race surrounding said input shaft, said inner bearing race being coupled with said input shaft;

(b) an outer bearing race surrounding said output shaft, said outer bearing race being coupled with said output shaft; and (c) a sprag clutch disposed between said inner bearing race and said outer bearing race, said sprag clutch frictionally coupling said inner bearing race with said outer bearing race when said input shaft is rotated in one direction.

12. The apparatus as recited in claim 9, wherein said braking means comprises:

(a) a stationary brake drum, said brake drum being mounted to the interior of said housing;

(b) a plurality of friction plates, said friction plates being coupled to said output shaft;

(c) a plurality of steel plates, said steel plates interspaced with said friction plates, said steel plates being coupled to said brake drum, said brake drum preventing rotation of said steel plates;

(d) a pressure plate, said pressure plate being coupled to said brake drum; and (e) a piston, said piston being coupled with said housing, said piston being positioned adjacent to said plurality of friction plates and steel plates, said piston being operable to compress said plurality of friction plates and steel plates against said pressure plate when activated by said braking control means thereby preventing rotation of said driven element, rotational energy applied to said input shaft being transferred to said vehicle transmission upon disengagement of said braking means.

13. The apparatus as recited in claim 12, wherein said control means comprises:

(a) an electric solenoid;

(b) a spool valve; and (c) a pressurized oil supply, said electric solenoid being coupled to said spool valve, said spool valve being operable to direct said oil supply toward said piston, said piston being operable by said pressurized oil supply, whereby the user can activate said electric solenoid to rapidly engage or disengage said braking means.

* * * * *